(12) United States Patent
Zagade

(10) Patent No.: US 10,628,061 B2
(45) Date of Patent: Apr. 21, 2020

(54) SYSTEMS AND METHODS FOR REBALANCING STRIPED INFORMATION ACROSS MULTIPLE STORAGE DEVICES

(71) Applicant: Veritas Technologies LLC, Mountain View, CA (US)

(72) Inventor: Prajakta Chandrakant Zagade, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/964,178

(22) Filed: Apr. 27, 2018

(65) Prior Publication Data

US 2019/0332292 A1 Oct. 31, 2019

(51) Int. Cl.
*G06F 3/06* (2006.01)

(52) U.S. Cl.
CPC ............ *G06F 3/0631* (2013.01); *G06F 3/061* (2013.01); *G06F 3/0653* (2013.01); *G06F 3/0683* (2013.01)

(58) Field of Classification Search
CPC ...... G06F 3/0631; G06F 3/061; G06F 3/0653; G06F 3/0683
USPC .................................................. 711/170, 203
See application file for complete search history.

(56) References Cited

U.S. PATENT DOCUMENTS

| 6,609,176 B1 | 8/2003 | Mizuno | |
| 10,185,658 B2* | 1/2019 | O'Krafka | G06F 3/0604 |
| 2003/0225794 A1* | 12/2003 | Soulier | G06F 11/2061 |
| 2005/0015546 A1 | 1/2005 | Zohar et al. | |
| 2007/0118689 A1 | 5/2007 | Hyde, II et al. | |
| 2008/0049276 A1* | 2/2008 | Abe | G06F 3/0608 358/524 |
| 2012/0030425 A1 | 2/2012 | Becker-Szendy et al. | |
| 2014/0143220 A1* | 5/2014 | Foster | G06F 16/13 707/705 |
| 2015/0220281 A1* | 8/2015 | Frost | G06F 11/1068 711/3 |
| 2019/0012236 A1* | 1/2019 | Hitron | G06F 11/1076 |

OTHER PUBLICATIONS

Restriping a GPFS File System; IBM Knowledge Center; as accessed on Apr. 24, 2018; https://www.ibm.com/support/knowledgecenter/en/SSFKCN_4.1.0/com.ibm.cluster.gpfs.y4r1.gpfs100.doc/bl1adm_balance.htm.
Determining How Long Mmrestripefs Takes to Complete; as accessed on Apr. 24, 2018; https://www.ibm.com/support/knowledgecenter/SSFKCN_4.1.0.4/com.ibm.cluster.gpfs.v4r104.gpfs100.doc/bl1adm_restripe.htm.
International Search Report and Written Opinion received for PCT Application Serial No. PCT/US2019/029019 dated Sep. 4, 2019, 12 pages.

* cited by examiner

*Primary Examiner* — Pierre Miche Bataille
(74) *Attorney, Agent, or Firm* — FisherBroyles, LLP

(57) ABSTRACT

The disclosed computer-implemented method for rebalancing striped information across multiple storage devices may include (1) allocating "Y" contiguous storage spaces on "Y" physical devices, (2) dividing, at the computing device, the "Y" continuous storage spaces into "N" subvolumes, (3) allocating the "N" subvolumes to "X" logical stripes, (4) allocating each of the first "Y" logical stripes to a respective physical stripe in each of the "Y" physical stripes, (5) distributing remaining subvolumes to respective logical stripes, and (6) allocating the respective subvolumes across the "Y" physical stripes. Various other methods, systems, and computer-readable media are also disclosed.

20 Claims, 10 Drawing Sheets

400

|  | P0 | P1 |
|---|---|---|
|  | L0 | L1 |
|  | 0 | 1 |
|  | 6 | 7 |
|  | 12 | 13 |
|  | 18 | 19 |
|  | 24 | 25 |
|  | 30 | 31 |
|  | 36 | 37 |
|  | 42 | 43 |
|  | 48 | 49 |
|  | 54 | 55 |
|  |  |  |
| L2 | 2 | 8 |
|  | 14 | 20 |
|  | 26 | 32 |
|  | 38 | 44 |
|  | 50 | 56 |
|  |  |  |
| L3 | 3 | 9 |
|  | 21 | 27 |
|  | 39 | 45 |
|  | 57 | 15 |
|  | 33 | 51 |
|  |  |  |
| L4 | 4 | 10 |
|  | 28 | 34 |
|  | 52 | 58 |
|  | 16 | 40 |
|  | 22 | 46 |
|  |  |  |
| L5 | 5 | 11 |
|  | 35 | 41 |
|  | 17 | 47 |
|  | 23 | 53 |
|  | 29 | 59 |

| logical stripe 2:6, grow by 1 case ||||||||||
|---|---|---|---|---|---|---|---|---|---|
| | P0 | P1 | | P0 | P1 | P2 | P0 | P1 | P2 |
| | L0 | L1 | | L0 | L1 | L2 | L0 | L1 | L2 |
| | 0 | 1 | | 0 | 1 | 2 | 0 | 1 | 2 |
| | 6 | 7 | | 6 | 7 | 8 | 6 | 7 | 8 |
| | 12 | 13 | | 12 | 13 | 14 | 12 | 13 | 14 |
| | 18 | 19 | | 18 | 19 | 20 | 18 | 19 | 20 |
| | 24 | 25 | | 24 | 25 | 26 | 24 | 25 | 26 |
| | 30 | 31 | | 30 | 31 | 32 | 30 | 31 | 32 |
| | 36 | 37 | | 36 | 37 | 38 | 36 | 37 | 38 |
| | | | | | | | | | |
| | 42 | 43 | | 42 | 43 | 44 | 42 | 43 | 44 |
| | 48 | 49 | | 48 | 49 | 50 | 48 | 49 | 50 |
| | | | | | | | | | |
| | 54 | 55 | | 54 | 55 | 56 | 54 | 55 | 56 |
| | | | | | | | | | |
| L2 | 2 | 8 | | | | | | | |
| | 14 | 20 | | | | | | | |
| | 26 | 32 | | | | | | | |
| | 38 | 44 | | | | | | | |
| | 50 | 56 | | | | | | | |
| | | | | | | | | | |
| L3 | 3 | 9 | | 3 | 9 | 15 | 3 | 9 | 15 |
| | 21 | 27 | | 21 | 27 | 33 | 21 | 27 | 33 |
| | 39 | 45 | | 39 | 45 | 51 | 39 | 45 | 51 |
| | 57 | 15 | | 57 | | | | | 57 |
| | 33 | 51 | | | | | | | |
| | | | | | | | | | |
| L4 | 4 | 10 | | 4 | 10 | 16 | 4 | 10 | 16 |
| | 28 | 34 | | 28 | 34 | 40 | 28 | 34 | 40 |
| | 52 | 58 | | 52 | 58 | | | | 52 |
| | 16 | 40 | | 22 | 46 | | 22 | 46 | 58 |
| | 22 | 46 | | | | | | | |
| | | | | | | | | | |
| L5 | 5 | 11 | | 5 | 11 | 17 | 5 | 11 | 17 |
| | 35 | 41 | | 35 | 41 | 47 | 35 | 41 | 47 |
| | 17 | 47 | | | | | | | |
| | 23 | 53 | | 23 | 53 | | 23 | 53 | |
| | 29 | 59 | | 29 | 59 | | 29 | 59 | |

| | logical stripe 2:6, grow by 2 case | | | | | | | | | | |
|---|---|---|---|---|---|---|---|---|---|---|---|
| | P0 | P1 | P0 | P1 | P2 | P3 | P0 | P1 | P2 | P3 |
| | L0 | L1 | L0 | L1 | L2 | L3 | L0 | L1 | L2 | L3 |
| | 0 | 1 | 0 | 1 | 2 | 3 | 0 | 1 | 2 | 3 |
| | 6 | 7 | 6 | 7 | 8 | 9 | 6 | 7 | 8 | 9 |
| | 12 | 13 | 12 | 13 | 14 | 15 | 12 | 13 | 14 | 15 |
| | 18 | 19 | 18 | 19 | 20 | 21 | 18 | 19 | 20 | 21 |
| | 24 | 25 | 24 | 25 | 26 | 27 | 24 | 25 | 26 | 27 |
| | 30 | 31 | 30 | 31 | 32 | 33 | 30 | 31 | 32 | 33 |
| | 36 | 37 | 36 | 37 | 38 | 39 | 36 | 37 | 38 | 39 |
| | 42 | 43 | 42 | 43 | 44 | 45 | 42 | 43 | 44 | 45 |
| | 48 | 49 | 48 | 49 | 50 | 51 | 48 | 49 | 50 | 51 |
| | 54 | 55 | 54 | 55 | 56 | 57 | 54 | 55 | 56 | 57 |
| L2 | 2 | 8 | | | | | | | | |
| | 14 | 20 | | | | | | | | |
| | 26 | 32 | | | | | | | | |
| | 38 | 44 | | | | | | | | |
| | 50 | 56 | | | | | | | | |
| L3 | 3 | 9 | | | | | | | | |
| | 21 | 27 | | | | | | | | |
| | 39 | 45 | | | | | | | | |
| | 57 | 15 | | | | | | | | |
| | 33 | 51 | | | | | | | | |
| L4 | 4 | 10 | 4 | 10 | 16 | 22 | 4 | 10 | 16 | 22 |
| | 28 | 34 | 28 | 34 | 40 | 46 | 28 | 34 | 40 | 46 |
| | 52 | 58 | 52 | 58 | | | | | 52 | 58 |
| | 16 | 40 | | | | | | | | |
| | 22 | 46 | | | | | | | | |
| L5 | 5 | 11 | 5 | 11 | 17 | 23 | 5 | 11 | 17 | 23 |
| | 35 | 41 | 35 | 41 | 47 | 53 | 35 | 41 | 47 | 53 |
| | 17 | 47 | | | | | | | | |
| | 23 | 53 | | | | | | | | |
| | 29 | 59 | 29 | 59 | | | 29 | 59 | | |

| | | | | logical stripe 2:6, shrink by 2 case | | | | | | |
|---|---|---|---|---|---|---|---|---|---|---|
| P0 | P1 | P2 | P3 | P0 | P1 | P2 | P3 | | P0 | P1 |
| L0 | L1 | L2 | L3 | L0 | L1 | L2 | | | L0 | L1 |
| 0 | 1 | 2 | 3 | 0 | 1 | | | | 0 | 1 |
| 6 | 7 | 8 | 9 | 6 | 7 | | | | 6 | 7 |
| 12 | 13 | 14 | 15 | 12 | 13 | | | | 12 | 13 |
| 18 | 19 | 20 | 21 | 18 | 19 | | | | 18 | 19 |
| 24 | 25 | 26 | 27 | 24 | 25 | | | | 24 | 25 |
| 30 | 31 | 32 | 33 | 30 | 31 | | | | 30 | 31 |
| 36 | 37 | 38 | 39 | 36 | 37 | | | | 36 | 37 |
| 42 | 43 | 44 | 45 | 42 | 43 | | | | 42 | 43 |
| 48 | 49 | 50 | 51 | 48 | 49 | | | | 48 | 49 |
| 54 | 55 | 56 | 57 | 54 | 55 | | | | 54 | 55 |
| | | | | | | | | | | |
| | | | L2 | 2 | 8 | | | | 2 | 8 |
| | | | | 14 | 20 | | | | 14 | 20 |
| | | | | 26 | 32 | | | | 26 | 32 |
| | | | | 38 | 44 | | | | 38 | 44 |
| | | | | 50 | 56 | | | | 50 | 56 |
| | | | | | | | | | | |
| | | | L3 | 3 | 9 | | | | 3 | 9 |
| | | | | 21 | 27 | | | | 21 | 27 |
| | | | | 39 | 45 | | | | 39 | 45 |
| | | | | 57 | 15 | | | | 57 | 15 |
| | | | | 33 | 51 | | | | 33 | 51 |
| | | | | | | | | | | |
| 4 | 10 | 16 | 22 L4 | 4 | 10 | 16 | 22 | | 4 | 10 |
| 28 | 34 | 40 | 46 | 28 | 34 | 40 | 46 | | 28 | 34 |
| | | 52 | 58 | | | 52 | 58 | | 16 | 40 |
| | | | | | | | | | 22 | 46 |
| | | | | | | | | | 52 | 58 |
| | | | | | | | | | | |
| 5 | 11 | 17 | 23 L5 | 5 | 11 | 17 | 23 | | 5 | 11 |
| 35 | 41 | 47 | 53 | 35 | 41 | 47 | 53 | | 35 | 41 |
| | | | | | | | | | 17 | 47 |
| | | | | | | | | | 23 | 53 |
| 29 | 59 | | | 29 | 59 | | | | 29 | 59 |

*FIG. 9*

Relayout Improvement

| vol size | Relayout Type | Existing Relayout (min) | Optimized Relayout(min) | % Improvements |
|---|---|---|---|---|
| 600GB | grow col 2 to 3 | 70 | 3 | 95.71428571 |
| | grow col 2 to 4 | 72 | 4 | 94.44444444 |
| 900GB | grow col 2 to 3 | 99 | 5 | 94.94949495 |
| | grow col 2 to 4 | 103 | 6 | 94.17475728 |
| 1200GB | grow col 2 to 3 | 137 | 8 | 94.16058394 |
| | grow col 2 to 4 | 143 | 6 | 95.8041958 |

FIG. 10

SYSTEMS AND METHODS FOR REBALANCING STRIPED INFORMATION ACROSS MULTIPLE STORAGE DEVICES

BACKGROUND

Arrays of data storage devices may store data in a striped manner. Striping is a technique that segments data and stores different data segments on different physical storage devices in arrays of data storage devices. Striping increases I/O performance by enabling simultaneous access to data stored on the different physical storage devices. However, expanding and/or reducing numbers of physical storage devices in the arrays of data storage devices may require performing "relayout" processes. Relayout processes serially move striped data from initial groups of physical storage devices to temporary storage devices and then rewrite the striped data from the temporary storage devices to the revised group of physical storage devices. Relayout processes move a lot of data, serially, through required temporary storage devices. For example, adding a new stripe to a 1200 GB striped local volume using conventional relayout techniques may take 2.5 hours to complete, whereas adding the same stripe to a remote volume may take 24 hours to complete. The instant disclosure, therefore, identifies and addresses a need for systems and methods for rebalancing striped information across multiple storage devices.

SUMMARY

As will be described in greater detail below, the instant disclosure describes various systems and methods for rebalancing striped information across multiple storage devices by, for example, performing optimized logical striping.

In one embodiment, a method for rebalancing striped information across multiple storage devices may include (1) allocating "Y" contiguous storage spaces on "Y" physical devices, (2) dividing, at the computing device, the "Y" continuous storage spaces into "N" subvolumes, (3) allocating the "N" subvolumes to "X" logical stripes, (4) allocating each of the first "Y" logical stripes to a respective physical stripe in each of the "Y" physical stripes, (5) dividing remaining logical stripes by "Y" to form respective sub-logical stripes, and (6) allocating the respective subvolumes across the "Y" physical stripes.

In embodiments, dividing may include calculating "N" as a least common multiple of $\{2, 3, \ldots X\}$. In one example, the method may include tagging at least one logical stripe with a logical stripe identifier (e.g., "L0" for logical stripe zero). In some examples, the method may include tagging at least one sub-logical stripe with a sub-logical stripe identifier (e.g., "LL1" for sub-logical stripe one).

In one embodiment, the method may include checking at least one subvolume for overuse and moving, when a subvolume is identified as overused, the overused subvolume to a different physical stripe.

In embodiments, the method may include (1) adding "P" physical stripes, where "P" is an integer, (2) transferring the Y+1 to Y+P logical stripes and subvolumes therein to the additional "P" physical stripes, and (3) redistributing subvolumes in Y+P+1 and any higher logical stripes across the Y+P physical stripes. In one example, the method may include checking at least one subvolume for overuse and transferring, when an overused subvolume is detected, the overused subvolume to the additional "P" physical stripe. In some examples, the method may include (e.g., subsequently) (1) redistributing subvolumes from the Y+1 logical stripe across the first "Y" physical stripes, (2) redistributing subvolumes in Y+2 and any higher logical stripes across the first "Y" physical stripes, and (3) removing the Y+1 physical stripe from the multiple storage devices. In one embodiment, the method may include checking at least one subvolume for overuse and transferring, when an overused subvolume is detected, the overused subvolume to a physical stripe storing a fewest number of subvolumes.

In embodiments, the method may include (1) redistributing subvolumes from the "Y" logical stripe across the first "Y–1" physical stripes, (2) redistributing subvolumes in Y+1 and any higher logical stripes across the first "Y–1" physical stripes, and (3) removing the "Y" physical stripe from the multiple storage devices. In one example, the method may include checking at least one subvolume for overuse and transferring, when an overused subvolume is detected, the overused subvolume to a physical stripe storing a fewest number of subvolumes. In an example, the method may include (e.g., subsequently) (1) adding "P" physical stripes, where "P" is an integer, (2) transferring the Y+1 to Y+P logical stripes and subvolumes therein to the additional "P" physical stripes, and (3) redistributing subvolumes in Y+P+1 and any higher logical stripes across the Y+P physical stripes. In one embodiment, the method may include checking at least one subvolume for overuse and transferring, when an overused subvolume is detected, the overused subvolume to the additional physical stripe.

In one example, a system for rebalancing striped information across multiple storage devices may include several modules stored in memory, including (1) a first allocating module, stored in the memory, that allocates "Y" contiguous storage spaces on "Y" physical devices, (2) a dividing module, stored in the memory, that divides the "Y" continuous storage spaces into "N" subvolumes, (3) a second allocating module, stored in the memory, that allocates the "N" subvolumes to "X" logical stripes, (4) a third allocating module, stored in the memory, that allocates each of the first "Y" logical stripes to a respective physical stripe in each of the "Y" physical stripes, (5) a distributing module, stored in the memory, that divides remaining logical stripes by "Y" to form respective sub-logical stripes, and (6) an "Nth" allocating module, stored in the memory, that allocates the respective subvolumes across the "Y" physical stripes. The system may also include at least one physical processor that executes the first allocating module, the dividing module, the second allocating module, the third allocating module, the second dividing module, and the "Nth" allocating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) allocate "Y" contiguous storage spaces on "Y" physical devices, (2) divide, at the computing device, the "Y" continuous storage spaces into "N" subvolumes, (3) allocate the "N" subvolumes to "X" logical stripes, (4) allocate each of the first "Y" logical stripes to a respective physical stripe in each of the "Y" physical stripes, (5) divide remaining logical stripes by "Y" to form respective sub-logical stripes, and (6) allocate the respective subvolumes across the "Y" physical stripes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a diagram of an example allocation of subvolumes across multiple storage devices.

FIG. 6 is a diagram of an example reallocation of subvolumes across multiple storage devices when adding a storage device.

FIG. 7 is a diagram of an example reallocation of subvolumes across multiple storage devices when adding two storage devices.

FIG. 9 is a diagram of an example reallocation of subvolumes across multiple storage devices when removing two storage devices.

FIG. 10 is a chart comparing operational performance of conventional techniques to an example of operational performance of provided techniques.

Figure 1:
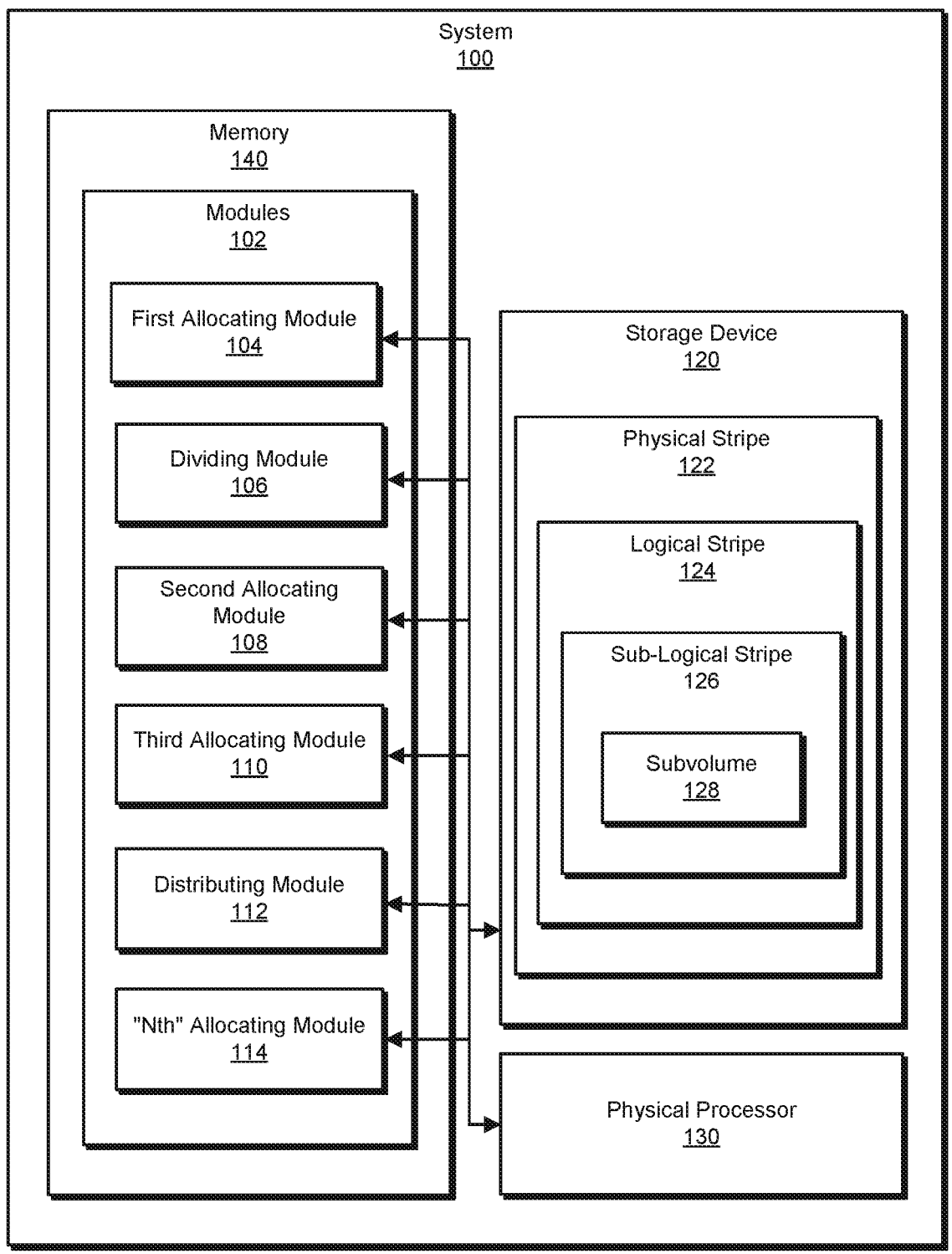
FIG. 1 is a block diagram of an example system for rebalancing striped information across multiple storage devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for rebalancing striped information across multiple storage devices. Provided systems and methods may rebalance striped information across multiple storage devices by performing optimized logical striping, where logical stripes may include subvolumes that may be transferred in balanced quantities across physical stripes prior to changing numbers of multiple storage devices. In embodiments, disclosed techniques may be utilized in connection with cloud-based storage devices.

By doing so, in some examples, the systems and methods described herein may improve the functioning of computing devices by automatically (re)balancing striped information across multiple storage devices, thus enabling cost-effective storage management. Also, in some examples, systems and methods described herein may save power by reducing quantities of data to be transferred. Provided methods may also not require using temporary storage space, may not require moving data to temporary space, may not require serially transferring substantially all data in multiple storage devices, and may not require moving as much data as conventional techniques, thus enabling cost-effective storage management. Provided methods may also move subvolumes of data in parallel (vs serially) and/or may transfer data faster. Also, in some examples, the systems and methods described herein may save power and/or better-manage network bandwidth utilization.

Figure 2:
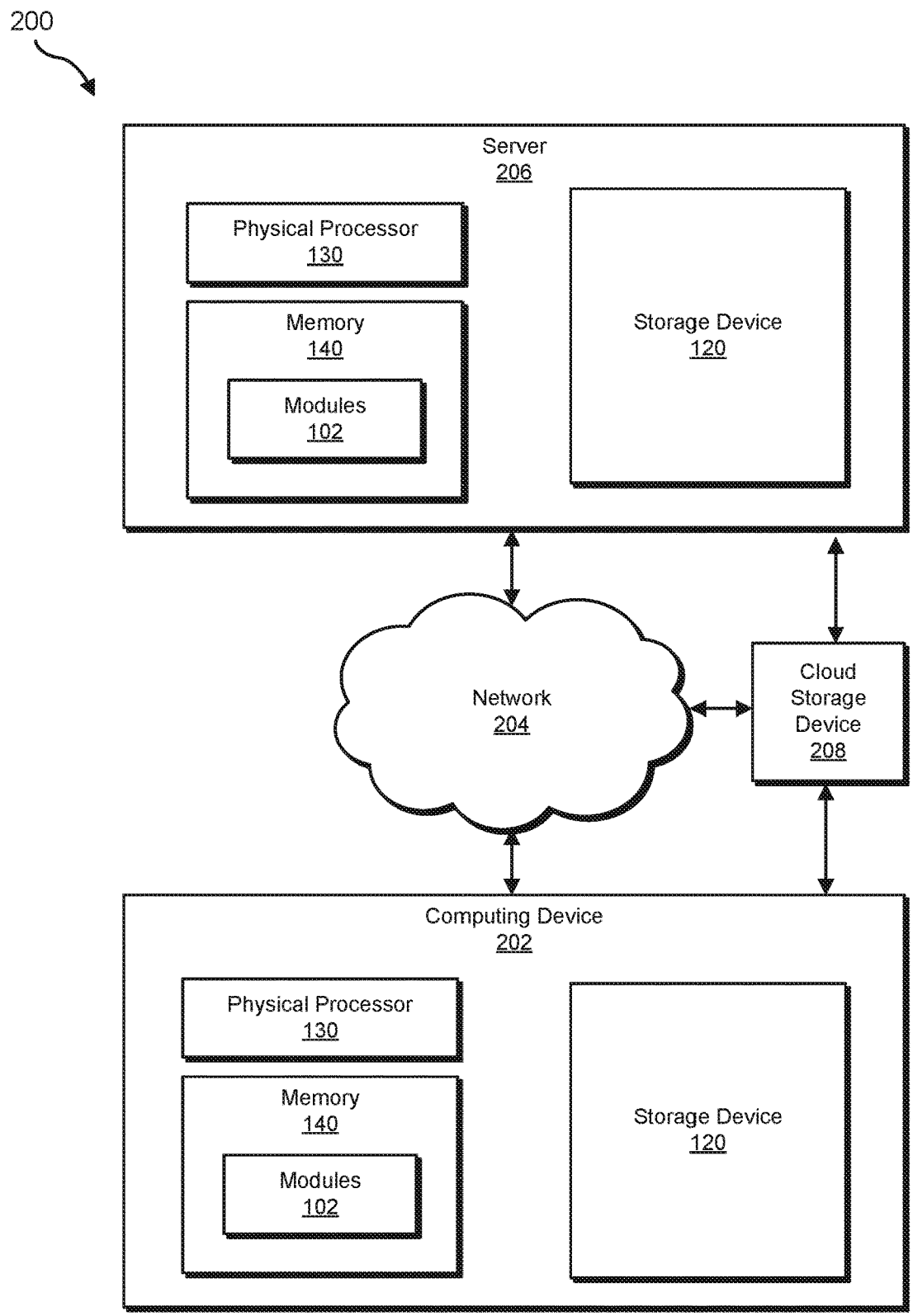
FIG. 2 is a block diagram of an additional example system for rebalancing striped information across multiple storage devices.

The following will provide, with reference to FIGS. 1-2, detailed descriptions of example systems for rebalancing striped information across multiple storage devices. Detailed descriptions of corresponding computer-implemented methods will also be provided in connection with FIGS. 3-9. In addition, detailed descriptions of performance of provided techniques relative to conventional techniques will also be provided in connection with FIG. 10.

FIG. 1 is a block diagram of an example system 100 for rebalancing striped information across multiple storage devices. As illustrated in this figure, example system 100 may include one or more modules 102 for performing one or more tasks. As will be explained in greater detail below, modules 102 may include a first allocating module 104, a dividing module 106, a second allocating module 108, a third allocating module 110, a distributing module 112, and an "Nth" allocating module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of a physical stripe 120, a logical stripe 124, a sub-logical stripe 126, and/or a subvolume 128. In embodiments, subvolume 128 may be a part of logical stripe 124 in an absence of sub-logical stripe 126. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate rebalancing striped information across multiple storage devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. Optional cloud storage device 208 may be coupled to computing device 202 and/or server 206, such as via network 204. In one example, all or a portion of functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to rebalance striped information across multiple storage devices.

Computing device 202 generally represents any type or form of computing device capable of reading computer-executable instructions. In some examples, computing device 202 may represent a computer running storage management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of reading computer-executable instructions. In some examples, server 206 may represent a computer running storage management software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Cloud storage device 208 generally represents any type or form of computing device that is capable of reading computer-executable instructions and/or storing information. In some examples, cloud storage device 208 may represent a computer running storage management software. Additional examples of cloud storage device 208 include, without limitation, one or more storage servers, database servers, application servers, and/or web servers configured to run certain software applications and/or provide various storage, database, and/or web services. Although illustrated as a single entity in FIG. 2, cloud storage device 208 may include and/or represent a plurality of servers that work and/or operate in conjunction with one another.

In some examples, cloud storage device 208 may store one or more of physical stripe 120, logical stripe 124, sub-logical stripe 126, and/or subvolume 128.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
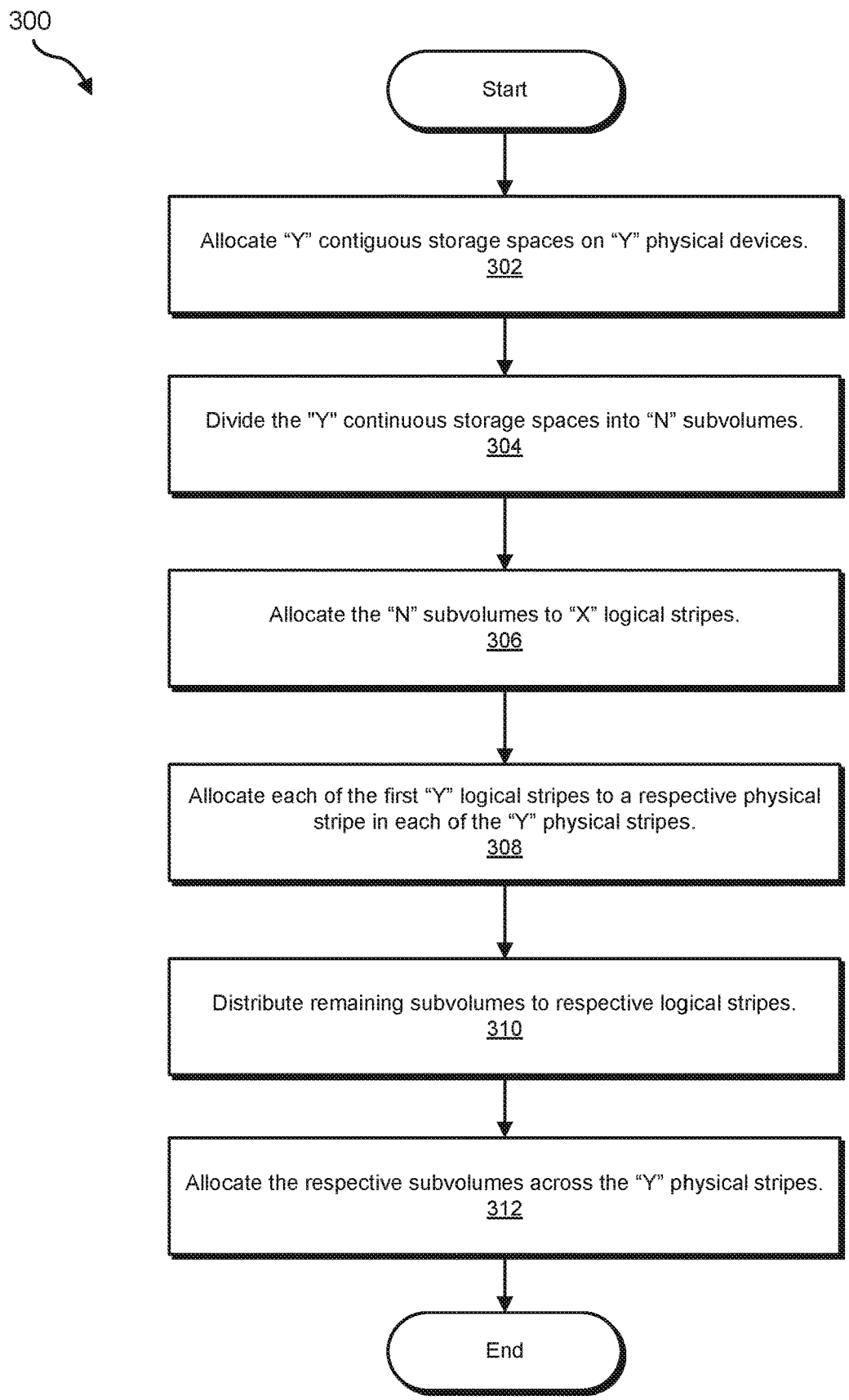
FIG. 3 is a flow diagram of an example method for rebalancing striped information across multiple storage devices.

FIG. 3 is a flow diagram of an example computer-implemented method 300 for rebalancing striped information across multiple storage devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. In embodiments, method 300 may start with allocating subvolumes 128 to multiple storage devices, such as storage device 120 and/or cloud storage device 208.

As illustrated in FIG. 3, at step 302 one or more of the systems described herein may allocate "Y" contiguous storage spaces (e.g., create "Y" physical stripes) on "Y" physical devices (e.g., on multiple storage devices). The systems described herein may perform step 302 in a variety of ways. In an example, first allocating module 104 may, as part of computing device 202 and/or server 206 in FIG. 2, allocate "Y" contiguous storage spaces on "Y" physical devices, such as storage devices 120 in computing device 202, storage devices 120 in server 206, and/or storage devices in cloud storage device 208. For example, first allocating module 104 may, as part of computing device 202 and/or server 206 in FIG. 2, create "Y" physical stripes 122 on multiple storage devices 120, such as storage devices 120 in computing device 202, storage devices 120 in server 206, and/or storage devices in cloud storage device 208. In some examples, "Y" is an integer.

In an example, physical stripes 122 may already be present on multiple storage devices 120 prior to initiating method 300.

As illustrated in FIG. 3, at step 304 one or more of the systems described herein may divide the "Y" continuous storage spaces into "N" subvolumes or chunks. The systems described herein may perform step 304 in a variety of ways. In an example, dividing module 106 may, as part of computing device 202 and/or server 206 in FIG. 2, divide the "Y" continuous storage spaces into "N" subvolumes 128. For example, dividing module 106 may, as part of computing device 202 and/or server 206 in FIG. 2, divide storage space in multiple storage devices 120 into "N" subvolumes 128. In some examples, "N" is an integer.

In an example, dividing may include calculating "N" as a least common multiple of $\{2, 3, \ldots X\}$, where "X" is a maximum number of logical stripes. In some examples, "X" is an integer number.

The term "subvolume," as used herein, may generally refer to like-sized units of information storage space. Examples of subvolumes are described herein with respect to FIG. 4.

As illustrated in FIG. 3, at step 306 one or more of the systems described herein may allocate "N" subvolumes to "X" logical stripes. The systems described herein may perform step 306 in a variety of ways. For example, second allocating module 108 may, as part of computing device 202 and/or server 206 in FIG. 2, allocate "N" subvolumes 128 to "X" logical stripes 124.

In an example, method 300 may include tagging at least one logical stripe with a logical stripe identifier.

In some embodiments, method 300 may include allocating an equal number of subvolumes 128 to each of the "X" logical stripes.

The term "logical stripe," as used herein, generally refers to a logical group of subvolumes. Examples of logical stripes are described herein with respect to FIG. 4.

As illustrated in FIG. 3, at step 308 one or more of the systems described herein may allocate each of first "Y" logical stripes to a respective physical stripe in each of "Y" physical stripes. In other words, lower-numbered logical stripes may be stored substantially in their entireties on a respective physical stripe, such as with one logical stripe being stored substantially entirely on each respective physical stripe. The systems described herein may perform step 308 in a variety of ways. For example, third allocating module 110 may, as part of computing device 202 and/or server 206 in FIG. 2, allocate each of first "Y" logical stripes 124 to a respective physical stripe in each of "Y" physical stripes 122.

As illustrated in FIG. 3, at step 310 one or more of the systems described herein may distribute remaining subvolumes to respective logical stripes, and in some cases, to respective sub-logical stripes. The systems described herein may perform step 310 in a variety of ways. In an example, distributing module 112 may, as part of computing device 202 and/or server 206 in FIG. 2, distribute remaining subvolumes 128 to respective logical stripes 124, and in some cases, to respective sub-logical stripes 126. For example, distributing module 112 may, as part of computing device 202 and/or server 206 in FIG. 2, divide remaining logical stripes 124 by "Y" to form respective sub-logical stripes 126.

In an example, method 300 may include tagging at least one sub-logical stripe with a sub-logical stripe identifier.

The term "sub-logical stripe," as used herein, generally refers to a sub-group of subvolumes in a logical stripe. In an example, subvolumes in a sub-logical stripe may be stored across different physical stripes.

As illustrated in FIG. 3, at step 312 one or more of the systems described herein may allocate the respective subvolumes across the "Y" physical stripes. The systems described herein may perform step 312 in a variety of ways. In an example, "Nth" allocating module 114 may, as part of computing device 202 and/or server 206 in FIG. 2, allocate the respective subvolumes 128 across the "Y" physical stripes 122. For example, "Nth" allocating module 114 may, as part of computing device 202 and/or server 206 in FIG. 2, allocate respective sub-logical stripes 126 across "Y" physical stripes 122 for each logical stripe 124. In an embodiment, "N" is an integer such as four.

In an example, method 300 may include checking at least one subvolume for overuse and may include moving, when a subvolume is identified as overused, the overused subvolume to a different physical stripe. In an embodiment, when a logical stripe includes an overused subvolume, the logical stripe may be identified as an overused stripe.

FIG. 4 is a diagram of an example allocation of subvolumes across multiple storage devices 400. In FIG. 4, "Pi" refers to a respective physical stripe "i" (e.g., "P0" represents physical stripe zero). Further, "Lj" refers to a respective logical stripe "j" (e.g., "L0" represents logical stripe zero). In FIG. 4, subvolumes are represented by blocks including a respective number (e.g., physical stripe P0 includes logical strip L0, which includes subvolume zero). Accordingly, as a result of performing method 300, logical stripe L0 is stored on physical stripe P0 and includes subvolumes 0, 6, 12, 18, 24, 30, 36, 42, 48, and 54. In this example, logical stripe L0 does not include any sub-logical stripes. Further, logical stripe L1 is stored on physical stripe P1 and includes subvolumes 1, 7, 13, 19, 25, 31, 37, 43, 49, and 55. In this example, logical stripe L1 does not include any sub-logical stripes. Additionally, logical stripe L0 is stored in part on physical stripe P0 and in part on physical stripe P1. Logical stripe L0 includes two sub-logical stripes. A first sub-logical stripe of L2 is stored on physical stripe P0 and includes subvolumes 2, 14, 26, 38, and 50. A second sub-logical stripe of L2 is stored on physical stripe P1 and includes subvolumes 8, 20, 32, 44, and 56. FIG. 4 also depicts overused subvolumes 52 and 57-58, which are depicted by respective triangles in upper right corners of respective subvolume blocks.

In some examples, methods for allocating subvolumes may include (1) dividing a complete volume space into "N" subvolumes, where N=LCM (y, 3, 4, 5, . . . x), "x"=maximum number of stripes to support, and "y"=a minimum number of stripes to support, (2) applying a recursive logical striping algorithm to all sub volumes (0 to N−1), (3) tagging a logical stripe property to each subvolume until a recursion level reaches a logical stripe number that is equal or smaller than a highest available physical stripe, (4) while allocating first subvolumes of a logical stripe, check where last subvolume of logical stripe(s) was allocated from and select a next physical stripe to which to allocate subvolumes, and (5) while tagging, determine if there are any overused subvolumes in a stripe and tag overused subvolumes as being overused.

Figure 5:
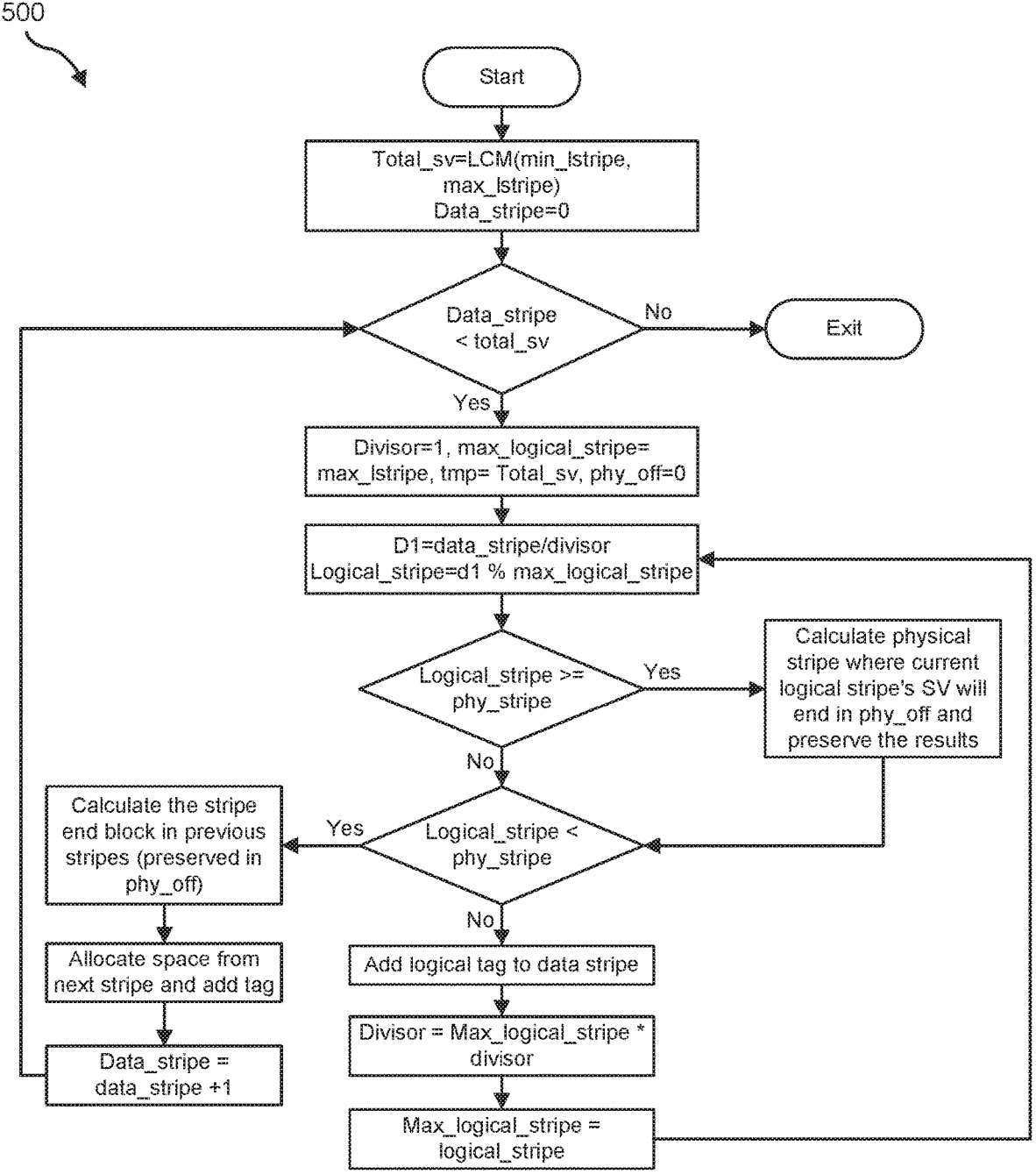
FIG. 5 is a flow diagram of an example method for allocating subvolumes across multiple storage devices.

FIG. 5 is an example flow diagram of an example computer-implemented method for allocating subvolumes across multiple storage devices 500. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps. In embodiments, method 500 may allocate subvolumes 128 to multiple storage devices, such as storage device 120 and/or cloud storage device 208.

In some embodiments, new storage devices and/or physical stripes may be added to may be added to an initial group of multiple storage devices. When new storage devices and/or physical stripes are added, optimized relayout methods may be performed to optimize allocation of storage space. For example, returning to FIG. 3, method 300 may include (1) adding an additional physical stripe (e.g., on an added storage device), (2) transferring the Y+1 logical stripe and subvolumes therein to the additional physical stripe, and (3) redistributing subvolumes in Y+2 and any higher logical stripes across the Y+1 physical stripes. In an embodiment, method 300 may include (1) adding "P" physical stripes, where "P" is an integer, (2) transferring the Y+1 to Y+P logical stripes and subvolumes therein to the additional "P" physical stripes, and (3) redistributing subvolumes in Y+P+1 and any higher logical stripes across the Y+P physical stripes. In one example, method 300 may include checking at least one subvolume for overuse and transferring, when an overused subvolume is detected, the overused subvolume to the additional physical stripe.

FIG. 6 is a diagram of an example reallocation of subvolumes across multiple storage devices when adding a storage device 600. The left side of FIG. 6 depicts initial conditions similar to those of FIG. 4. The center portion of FIG. 6 depicts adding new physical stripe P2, moving logical stripe L2 to physical stripe P2, and redistributing subvolumes from logical stripes L3-L5 across physical stripes P0-P2. The right side of FIG. 6 depicts moving transferring overused subvolumes 52 and 57-58 to new physical stripe P2.

FIG. 7 is a diagram of an example reallocation of subvolumes across multiple storage devices when adding two storage devices 700. The left side of FIG. 7 depicts initial conditions similar to those of FIG. 4. The center portion of FIG. 7 depicts adding new physical stripes P2-P3, moving logical stripe L2 to physical stripe P2, moving logical stripe L3 to physical stripe P3, and redistributing subvolumes from logical stripes L4-L5 across physical stripes P0-P3. The right side of FIG. 7 depicts moving transferring overused subvolumes 52 and 58 to new physical stripes P2-P3.

Returning to FIG. 3, in some examples, after new storage devices and/or physical stripes are added, storage devices and/or physical stripes may subsequently be removed. When storage devices and/or physical stripes are subsequently removed, optimized relayout methods may be performed to optimize allocation of storage space. For example, method 300 may include (e.g., subsequently) (1) redistributing subvolumes from the Y+1 logical stripe across the first "Y" physical stripes, (2) redistributing subvolumes in Y+2 and any higher logical stripes across the first "Y" physical stripes, and (3) removing the Y+1 physical stripe from the multiple storage devices (e.g., from a storage device to be removed). In one embodiment, method 300 may include checking at least one subvolume for overuse and transferring, when an overused subvolume is detected, the overused subvolume to a physical stripe storing a fewest number of subvolumes.

In some embodiments, storage devices and/or physical stripes may be removed from initial groups of multiple storage devices. When storage devices and/or physical stripes are removed from initial groups of multiple storage devices, optimized relayout methods may be performed to optimize allocation of storage space. For example, method 300 may include (1) redistributing subvolumes from the "Y" logical stripe across the first "Y−1" physical stripes, (2) redistributing subvolumes in Y+1 and any higher logical stripes across the first "Y−1" physical stripes, and (3) removing the "Y" physical stripe from the multiple storage devices (e.g., from a storage device to be removed). In one example, method 300 may include checking at least one subvolume for overuse and transferring, when an overused subvolume is detected, the overused subvolume to a physical stripe storing a fewest number of subvolumes.

Figure 8:
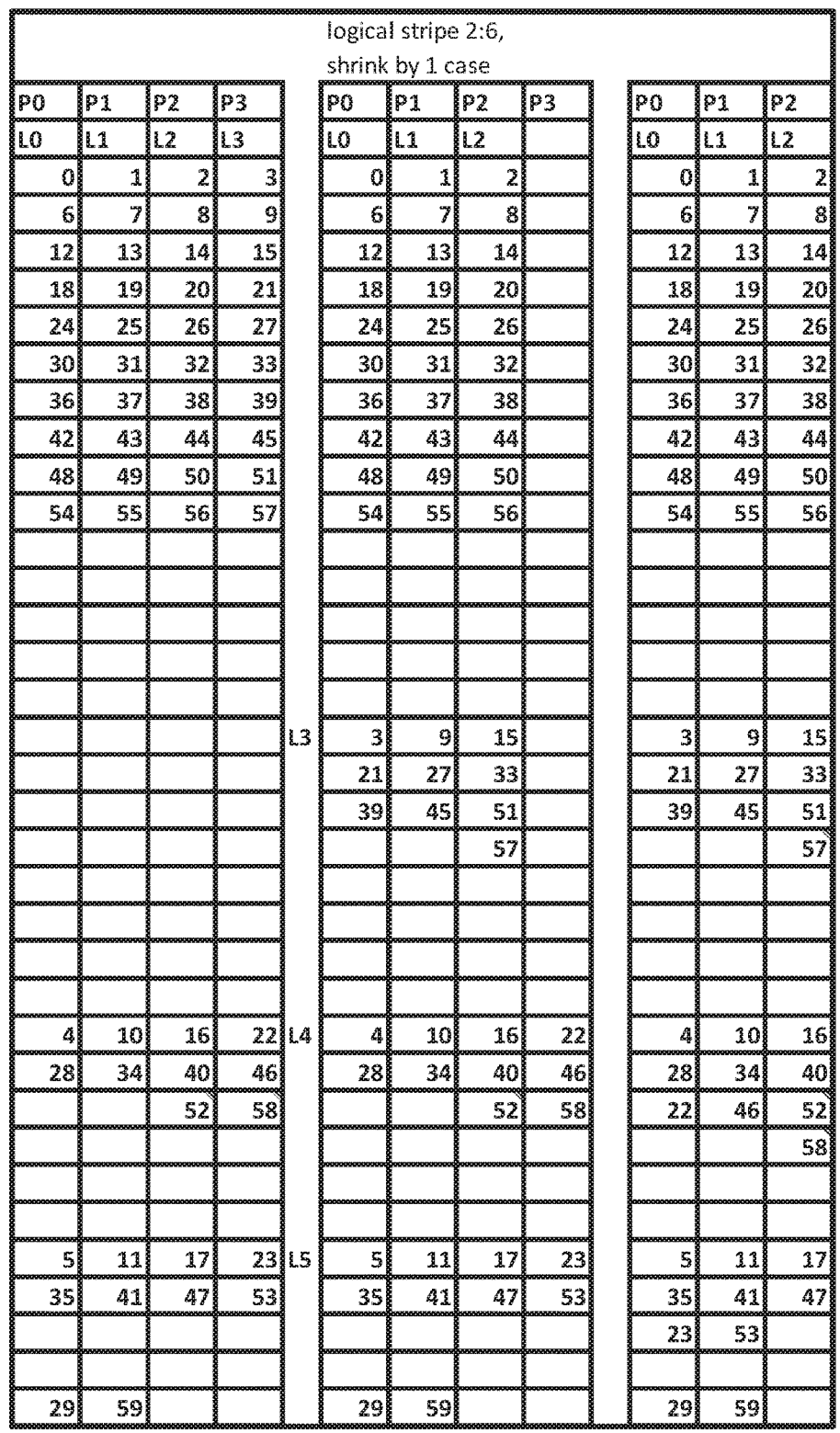
FIG. 8 is a diagram of an example reallocation of subvolumes across multiple storage devices when removing a storage device.

FIG. 8 is a diagram of an example reallocation of subvolumes across multiple storage devices when removing a storage device 800. The left side of FIG. 8 depicts initial conditions similar to those of the right side of FIG. 7. The center portion of FIG. 8 depicts preparing to remove physical stripe P3 and redistributing subvolumes in logical stripe L3 across physical stripes P0-P2. Subvolumes in logical stripes L4-L5 are redistributed across physical stripes P0-P2. The right side of FIG. 8 depicts removal of physical stripe P3.

FIG. 9 is a diagram of an example reallocation of subvolumes across multiple storage devices when removing two storage devices 900. The left side of FIG. 9 depicts initial conditions similar to those of the right side of FIG. 7. The center portion of FIG. 9 depicts preparing to remove physical stripes P2-P3 and redistributing subvolumes in logical stripes L2-L3 across physical stripes P0-P1. Subvolumes in logical stripes L4-L5 are redistributed across physical stripes P0-P1. The right side of FIG. 9 depicts removal of physical stripes P2-P3.

Returning to FIG. 3, in some examples, after new storage devices and/or physical stripes are removed, new storage devices and/or new physical stripes may subsequently be added. When storage devices and/or new storage devices and/or new physical stripes are subsequently added, optimized relayout methods may be performed to optimize allocation of storage space. For example, method 300 may include (e.g., subsequently) (1) adding an additional physical stripe (e.g., on an added storage device), (2) transferring the Y−1 logical stripe and subvolumes therein to the additional physical stripe, and (3) redistributing subvolumes in "Y" and any higher logical stripes across the "Y" physical stripes. In an embodiment, method 300 may include (1) adding "P" physical stripes, where "P" is an integer, (2) transferring the Y+1 to Y+P logical stripes and subvolumes therein to the additional "P" physical stripes, and (3) redistributing subvolumes in Y+P+1 and any higher logical stripes across the Y+P physical stripes. In one embodiment, method 300 may include checking at least one subvolume for overuse and transferring, when an overused subvolume is detected, the overused subvolume to the additional physical stripe.

FIG. 10 is a chart comparing operational performance of conventional techniques ("existing") to an example of operational performance of provided optimized techniques 1000. In some examples, improvements in relayout time may be 94%-95% for volume sizes of 600 GB-1200 GB and growing volume size from 2 physical stripes to either 3 or 4 physical stripes.

In some examples, provided optimized techniques with two physical stripes, eight logical stripes, and 840 subvolumes may beneficially provide only a slight decline in input/output performance of a 6.16% drop in write relayout time and a 1.86% drop in read relayout time. In additional embodiments, provided optimized techniques with three physical stripes, eight logical stripes, and 840 subvolumes may beneficially provide only a slight decline in input/output performance of a 6.05% drop in write relayout time and a 3.49% drop in read relayout time.

As detailed above, the steps outlined herein may provide methods for rebalancing striped information across multiple storage devices. In some examples, the provided systems and methods may be used with striped storage devices. By doing so, in some examples, the systems and methods described herein may improve the functioning of computing devices by automatically (re)balancing striped information across multiple storage devices, thus enabling cost-effective storage management. Also, in some examples, the systems and methods described herein may save power by reducing a quantity of data to be transferred. Provided methods may also not require using temporary storage space, may not require serially transferring substantially all data in the multiple storage devices, and may not require moving as much data as conventional techniques.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for rebalancing striped information across multiple storage devices, at least a portion of the method being performed by a computing device comprising at least one processor, the method comprising:
    allocating "Y" contiguous physical storage spaces on "Y" physical storage devices in the multiple storage devices to create "Y" physical stripes;
    dividing, at the computing device, the "Y" contiguous physical storage spaces into "N" subvolumes;
    allocating the "N" subvolumes to "X" logical stripes;
    allocating each of the first "Y" logical stripes to a respective physical stripe in each of the "Y" physical stripes;
    dividing remaining logical stripes by "Y" to form respective sub-logical stripes; and
    allocating the respective sub-logical stripes across the "Y" physical stripes.

2. The computer-implemented method of claim 1, wherein dividing includes calculating "N" as a least common multiple of {2, 3, . . . X}.

3. The computer-implemented method of claim 1, further comprising:
    tagging at least one logical stripe with a logical stripe identifier.

4. The computer-implemented method of claim 1, further comprising:
    tagging at least one sub-logical stripe with a sub-logical stripe identifier.

5. The computer-implemented method of claim 1, further comprising:
    checking at least one subvolume for overuse; and
    moving, when a subvolume is identified as overused, the overused subvolume to a different physical stripe.

6. The computer-implemented method of claim 1, further comprising:
    adding, following allocating the respective sub-logical stripes across the "Y" physical stripes, "P" physical stripes to the multiple storage devices, wherein "P" is an integer;
    transferring the Y+1 to Y+P logical stripes and subvolumes therein to the additional "P" physical stripes; and
    redistributing subvolumes in Y+P+1 and any higher numbered logical stripes across the Y+P physical stripes.

7. The computer-implemented method of claim 6, further comprising:
    checking at least one subvolume for overuse; and
    transferring, when an overused subvolume is detected, the overused subvolume to the additional "P" physical stripes.

8. The computer-implemented method of claim 6, further comprising:
    redistributing subvolumes from the Y+1 logical stripe across the first "Y" physical stripes;
    redistributing subvolumes in Y+2 and any higher numbered logical stripes across the first "Y" physical stripes; and
    removing the Y+1 physical stripe from the multiple storage devices.

9. The computer-implemented method of claim 8, further comprising:
    checking at least one subvolume for overuse; and
    transferring, when an overused subvolume is detected, the overused subvolume to a physical stripe storing a fewest number of subvolumes.

10. The computer-implemented method of claim 1, further comprising:
    redistributing subvolumes from the "Y" logical stripe across the first "Y–1" physical stripes;
    redistributing subvolumes in Y+1 and any higher numbered logical stripes across the first "Y–1" physical stripes; and
    removing the "Y" physical stripe from the multiple storage devices.

11. The computer-implemented method of claim 10, further comprising:
    checking at least one subvolume for overuse; and
    transferring, when an overused subvolume is detected, the overused subvolume to a physical stripe storing a fewest number of subvolumes.

12. The computer-implemented method of claim 10, further comprising:
    adding "P" physical stripes, wherein "P" is an integer;
    transferring the Y+1 to Y+P logical stripes and subvolumes therein to the additional "P" physical stripes; and
    redistributing subvolumes in Y+P+1 and any higher numbered logical stripes across the Y+P physical stripes.

13. The computer-implemented method of claim 12, further comprising:
    checking at least one subvolume for overuse; and
    transferring, when an overused subvolume is detected, the overused subvolume to the additional "P" physical stripes.

14. A system for rebalancing striped information across multiple storage devices, the system comprising:
    a first allocating module, stored in memory, that allocates "Y" contiguous physical storage spaces on "Y" physical storage devices in the multiple storage devices to create "Y" physical stripes;
    a dividing module, stored in the memory, that divides the "Y" contiguous physical storage spaces into "N" subvolumes;
    a second allocating module, stored in the memory, that allocates the "N" subvolumes to "X" logical stripes;
    a third allocating module, stored in the memory, that allocates each of the first "Y" logical stripes to a respective physical stripe in each of the "Y" physical stripes;
    wherein the dividing module divides remaining logical stripes by "Y" to form respective sub-logical stripes;
    an "Nth" allocating module, stored in the memory, that allocates the respective sub-logical stripes across the "Y" physical stripes; and
    at least one physical processor that executes the first allocating module, the dividing module, the second allocating module, the third allocating module, and the "Nth" allocating module.

15. The system of claim 14, further comprising:
    a checking module, stored in the memory, that checks at least one subvolume for overuse; and a moving module, stored in the memory, that moves, when a subvolume is identified as overused, the overused subvolume to a different physical stripe.

16. The system of claim 14, further comprising:
an adding module, stored in the memory, that adds, following allocating the respective sub-logical stripes across the "Y" physical stripes, "P" physical stripes to the multiple storage devices, wherein "P" is an integer;
a transferring module, stored in the memory, that transfers the Y+1 to Y+P logical stripes and subvolumes therein to the additional "P" physical stripes; and
a redistributing module, stored in the memory, that redistributes subvolumes in Y+P+1 and any higher numbered logical stripes across the Y+P physical stripes.

17. The system of claim 14, further comprising:
a first redistributing module, stored in the memory, that redistributes subvolumes from the "Y" logical stripe across the first "Y−1" physical stripes;
a second redistributing module, stored in the memory, that redistributes subvolumes in Y+1 and any higher numbered logical stripes across the first "Y−1" physical stripes; and
a removing module, stored in the memory, that removes the "Y" physical stripe from the multiple storage devices.

18. A non-transitory computer-readable medium comprising one or more computer-executable instructions that, when executed by at least one processor of a computing device, cause the computing device to:
allocate "Y" contiguous physical storage spaces on "Y" physical storage devices in multiple storage devices to create "Y" physical stripes;
divide, at the computing device, the "Y" contiguous physical storage spaces into "N" subvolumes;
allocate the "N" subvolumes to "X" logical stripes;
allocate each of the first "Y" logical stripes to a respective physical stripe in each of the "Y" physical stripes;
divide remaining logical stripes by "Y" to form respective sub-logical stripes; and
allocate the respective sub-logical stripes across the "Y" physical stripes.

19. The non-transitory computer-readable medium of claim 18, further comprising computer-executable instructions that cause the computing device to:
add, following allocating the respective sub-logical stripes across the "Y" physical stripes, "P" physical stripes to the multiple storage devices, wherein "P" is an integer;
transfer the Y+1 to Y+P logical stripes and subvolumes therein to the additional "P" physical stripes; and
redistribute subvolumes in Y+P+1 and any higher numbered logical stripes across the Y+P physical stripes.

20. The non-transitory computer-readable medium of claim 18, further comprising computer-executable instructions that cause the computing device to:
redistribute subvolumes from the "Y" logical stripe across the first "Y−1" physical stripes;
redistribute subvolumes in Y+1 and any higher logical stripes across the first "Y−1" physical stripes; and
remove the "Y" physical stripe from the multiple storage devices.

* * * * *